United States Patent [19]

Kishi et al.

[11] Patent Number: 4,633,469

[45] Date of Patent: Dec. 30, 1986

[54] METHOD OF INDICATING DIAGNOSTIC RESULTS

[75] Inventors: Hajimu Kishi; Kunio Tanaka, both of Tokyo, Japan

[73] Assignee: Fanuc Ltd., Minamitsuru, Japan

[21] Appl. No.: 619,560

[22] PCT Filed: Oct. 11, 1983

[86] PCT No.: PCT/JP83/00336

§ 371 Date: Jun. 8, 1984

§ 102(e) Date: Jun. 8, 1984

[87] PCT Pub. No.: WO84/01639

PCT Pub. Date: Apr. 26, 1984

[30] Foreign Application Priority Data

Oct. 13, 1982 [JP]  Japan ................................. 57-179351

[51] Int. Cl.[4] .................... G01R 31/28; G06F 11/00
[52] U.S. Cl. ............................................. 371/29; 371/20
[58] Field of Search ................ 371/29, 17, 20, 16; 364/200, 900

[56] References Cited

U.S. PATENT DOCUMENTS 3,575,589  4/1971  Neema et al. .................... 371/29 X
4,133,477  1/1979  Marino et al. .................... 371/29 X
4,158,431  6/1979  van Bavel et al. .................... 371/29
4,200,224  4/1980  Flint .................................. 371/29 X
4,455,653  6/1984  Le Gars et al. ........................ 371/20
4,497,057  1/1985  Kato et al. ............................ 371/29
4,499,581  2/1985  Miazga et al. ........................ 371/20
4,541,057  9/1985  Hagiwara ........................ 364/900 X Primary Examiner—Charles E. Atkinson
Attorney, Agent, or Firm—Staas & Halsey

[57] ABSTRACT

A method of indicating the results of diagnosing an apparatus in which a processor (105) performs prescribed processing under the control of a control program, which is stored in a ROM (102), using input information entered from a keyboard (101) having a plurality of keys (101a-1, 101a-2; 101b-1, 101b-2; . . . 101h-1, 101h-2) each of which is equipped with a lamp, various diagnostic tests are executed in accordance with a diagnostic program stored in the ROM (102). The method includes the steps of establishing correspondence between each diagnostic test and each of the lamps (101a-2, 101b-2, . . . 101h-2), starting the diagnostic program upon sensing, by a sensing unit 107, that electric power has been introduced, executing various diagnostic processes on the basis of the diagnostic program and, when a result of a diagnostic process is determined to represent a malfunction, lighting the lamps (101a-2, 101b-2, . . . 101h-2) corresponding to the processes for which the malfunctions have been determined.

6 Claims, 3 Drawing Figures

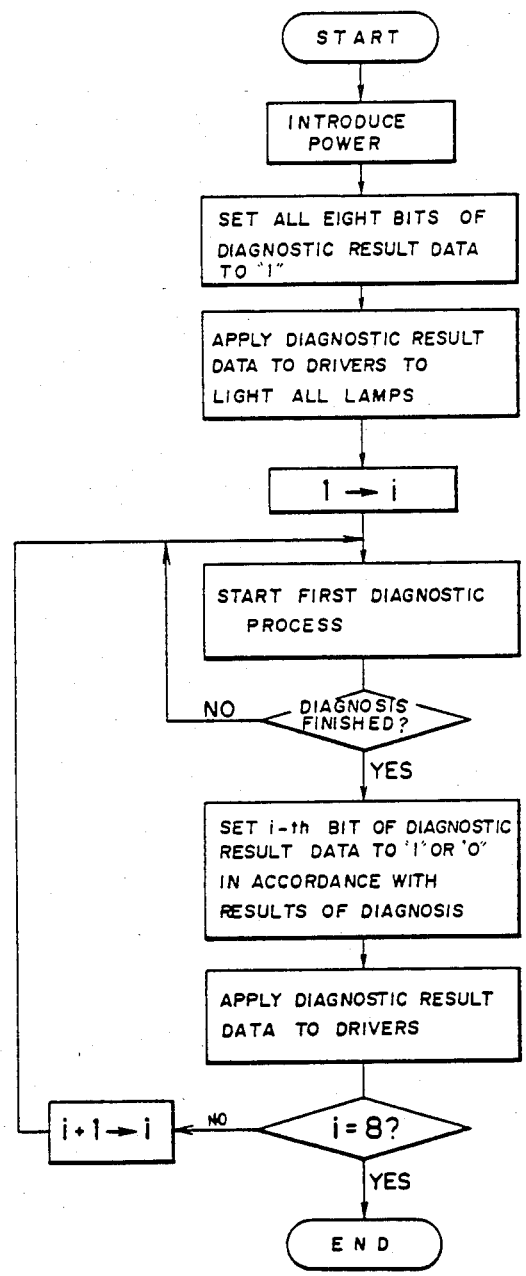

METHOD OF INDICATING DIAGNOSTIC RESULTS

BACKGROUND OF THE INVENTION

This invention relates to a method of indicating diagnostic results and, more particularly, to a method of indicating diagnostic results in which lamps provided on respective keys double as diagnostic result indicators.

Equipment which incorporates a computer, and which performs prescribed processing under the control of a control program on the basis of input information entered from a keyboard or the like, is usually equipped with a diagnostic function. Specifically, it is arranged so that a diagnostic program is registered or stored beforehand, various diagnostic processing is executed by starting the diagnostic program when a diagnostic mode is established, and the results of diagnosis are (1) displayed on a CRT or printed out by a printer, or (2) indicated by lighting error lamps provided on a panel.

With the former method of indicating diagnostic results by using the CRT or printer, it is necessary for one to read the diagnostic results. Moreover, there are instances where the CRT or printer develops a malfunction, making indication of the diagnostic results by these devices impossible. With the latter method of indicating diagnostic results by error lamps, the results can be readily understood based on whether or not the lamps are lit. However, a disadvantage with this arrangement is that costs are raised because it is necessary to provide an error lamp and drive circuit for each variety of diagnostic test.

SUMMARY OF THE INVENTION

Accordingly, an object of the present invention is to provide a novel method of indicating diagnostic results in which separate error lamps need not be provided, yet which indicates the results of diagnosis with reliabilty.

Another object of the present invention is to provide a method of indicating diagnostic results in which lamps, which belong to keys provided for other purposes on a keyboard, can be used to indicate the results of diagnosis.

Still another object of the present invention is to provide a highly reliable method of indicating diagnostic results in which the diagnostic results are indicated by lamps provided in keys and by a CRT.

The present invention is a method of indicating the results of diagnosing an apparatus which normally performs prescribed processing under the control of a control program using input information entered from a keyboard having a plurality of keys each of which is equipped with a lamp, and which carries out various diagnostic tests in accordance with a diagnostic program. According to this method of indicating diagnostic results, lamps belonging to keys provided on a keyboard are used for their original purpose and are also used for indicating the results of diagnosis. The method includes the steps of starting a diagnostic program by introducing power from a power supply, executing various diagnostic process steps on the basis of the diagnostic program and, when the result of diagnostic processing step is determined representing a malfunction by, lighting a lamp corresponding to the processing step for which the malfunction has been determined.

BRIEF DESCRIPTION OF THE DRAWINGS

FIG. 3 is a flowchart of processing according to the present invention.

DETAILED DESCRIPTION OF THE PREFERRED EMBODIMENTS

Figure 1:
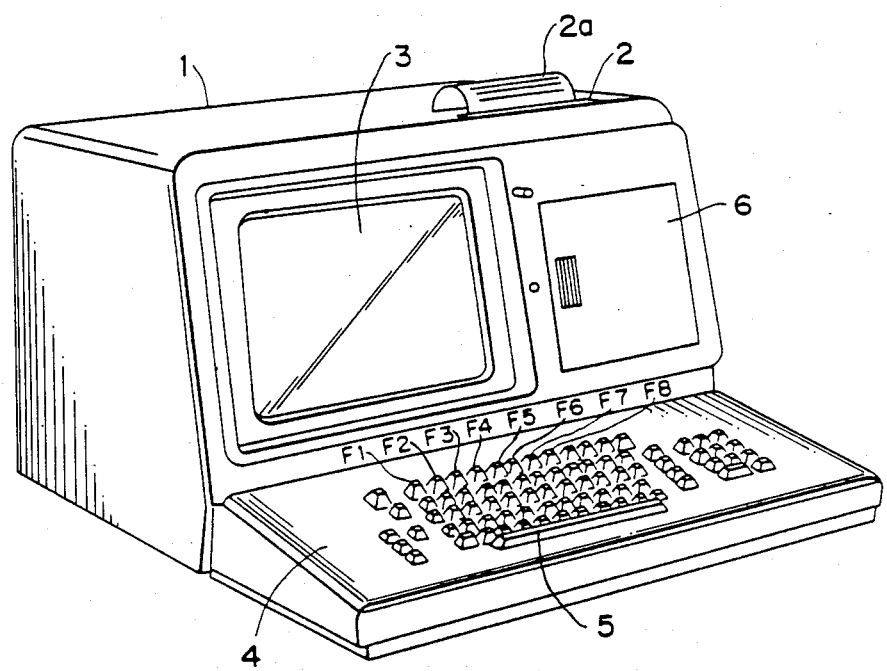
FIG. 1 is an external perspective view of an apparatus, to which the present invention can be applied, for automatically creating an NC tape.

The present invention will now be described in detail in conjunction with the drawings. FIG. 1 is an external perspective view of an apparatus to which the present invention can be applied, the apparatus being that for automatically creating an NC tape.

The top side of the apparatus 1 is provided with a printer 2, while the front side thereof is provided with a CRT display 3. Provided in front of the CRT display 3 is a keyboard 4 on which there are disposed a key group 5 of keys such as character keys, numeric keys and function keys. Disposed at the side of the CRT display 3 is a magnetic recording device 6 such as a floppy disk. Numeral 2a denotes recording paper which is printed on by the printer 2.

The apparatus 1 has an internal microprocessor and operator memory. The processor executes processing on the basis of a control program stored in the memory, and operator instructions and the results of processing are displayed on the CRT display 3. The processor also creates an NC program by executing prescribed processing on the basis of commands and data entered from the keyboard 4, and causes the NC program to be printed out by the printer 2 or stored in the magnetic recording device 6. In the key group 5, keys F1 through F8 are function keys each of which is equipped with a lamp. The functions keys F1 through F8 function to request the start of data entry from a variety of input-/output units connected to the apparatus 1, and the start of data output to the input/output units. Specifically, it is prearranged so that the function key F1 is a key for requesting the start of an output of data to the printer 2, the function key F2 a key for requesting an output of data to the floppy disk 6, the function key F3 a key for requesting an input of data from the floppy disk, the function key F4 a key for requesting an output of data to a bubble cassette memory, which is not shown, the function key F5 a key for requesting an input of data from the bubble cassette memory, and so forth. In accordance with these prearrangements, pressing the function key F1 lights the lamp of the function key and causes data, such as NC program data, which is stored in the internal memory of the apparatus 1, to be delivered to the printer 2, whereby the data is printed out on the recording paper 2a. Pressing the function key F2 or F4 lights the lamp of the function key and causes the NC program data to be delivered to the floppy disk 6 or bubble memory cassette. Similarly, pressing the function key F3 or F5 lights the lamp of the function key and causes data from the floppy disk 6 or bubble cassette memory to be applied as an input to the apparatus 1. The particular lamp is extinguished by the completion of the input or output operation. According to the present invention, the lamp of each of the function keys F1 through F8 may also be used to indicate the results of diagnosis.

Figure 2:
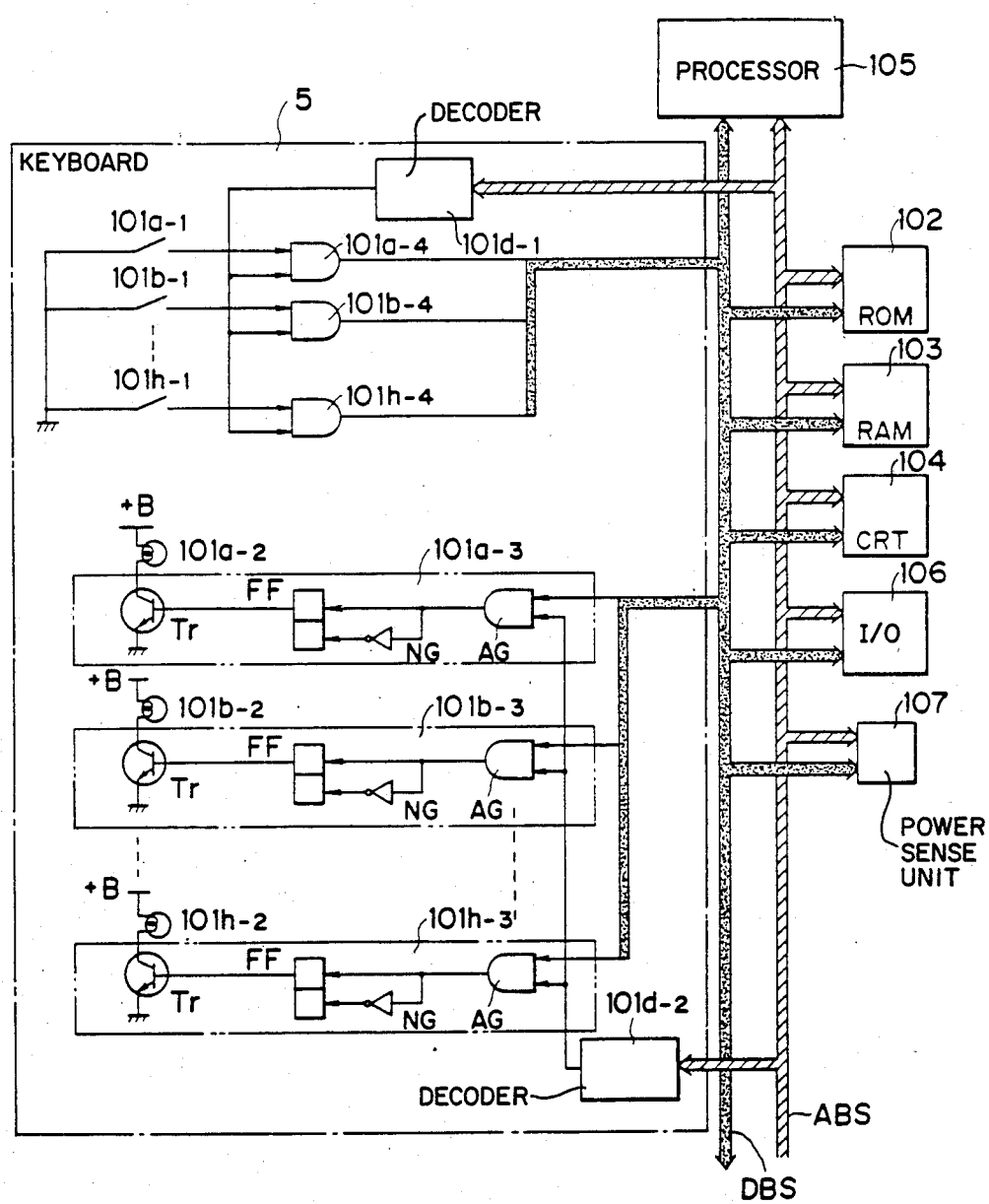
FIG. 2 is a block diagram of an embodiment of the present invention.

FIG. 2 is a block diagram of an embodiment of the present invention, and FIG. 3 is a flowchart of processing according to the embodiment of the invention.

In FIG. 2, the keyboard 5 includes a number of, say eight, function keys each equipped with a lamp, as well as other keys. The function keys have switches 101a-1, 101b-1, ..., 101h-1, and lamps 101a-2, 101b-2, ..., 101h-2, respectively. The lamps 101a-2, 101b-2, ..., 101h-2 are provided with respective drive circuits 101a-3, 101b-3, ..., 101h-3 for lighting the respective lamps, and with a single decoder 101d-2. The switches 101a-1, 101b-1, ..., 101h-1 are provided with drivers 101a-4, 101b-4, ..., 101h-4, respectively, each comprising an AND gate for delivering an on/off output from the respective switch, and with a single decoder 101d-1. The lamp lighting drive circuits 101a-3 through 101h-3 each include a transistor Tr connected in series with a respective one of the lamps 101a-1 through 101h-1, a flip-flop FF for turning the transistor Tr on and off, and an AND gate AG and NOT gate NG for setting and resetting the flip-flop FF. The decoders 101d-1, 101d-2 have their input side connected to an address bus ABS. Input terminals of the drive circuits 101a-3 through 101h-3, and output terminals of the drivers 101a-4 through 101h-4 are connected to a data bus DBS. Also connected to the data bus DBS are a ROM 102 storing a control program and a diagnostic program, a RAM 103 storing the results of processing, a CRT 104, processor 105, input/output 106, and a unit 107 for sensing introduction of power from a power supply. Hereinafter, operation will be described on the assumption that there are eight different diagnostic processes.

During operation, a power supply switch is closed, which is sensed by the power introduction sensing unit 107. In response, the diagnostic program stored in the ROM 107 starts to be run.

In response to a command in the diagnostic program, the processor 105 sets all eight bits, constituting eight-bit data indicative of diagnostic results, to "1". The processor 105 then delivers, over the address bus ABS, an address signal assigned to the lamp lighting drive circuits 101a-3 through 101h-3 and, over the data bus DBS, the eight-bit diagnostic result data set to all "1"s (11111111). The decoder 102d-2 decodes the address signal on the address bus and is so adapted as to produce a high-level ("1") output upon discriminating the address signal assigned to the drive circuits 101a-3 through 101h-3. Accordingly, all of the AND gates AG of the drive circuits 101a-3 through 101h-3 open. As a result, the all "1"s diagnostic result data on the data bus DBS is applied in parallel to the flip-flops FF through all the AND gates AG, whereby all of the flip-flops are set. Consequently, all transistors Tr are turned on, and all lamps 101a-2, 101b-2, ..., 101h-2 light.

At the conclusion of the process step for lighting all lamps, the processor 105, under the control of the diagnostic program, starts the processing for the first through eighth process steps. Among the various diagnostic processes are a battery check for the ROM 103, a battery check for the RAM 103, an input/output check, etc.

Correspondence is established beforehand so that lamp 101a-2 will indicate the diagnostic result of the battery check for ROM 102, lamp 101b-2 the diagnostic result of the battery check for RAM 103, and lamp 101h-2 the diagnostic result of the input/output check. Therefore, when the ROM 102 is determined to be operating normally in response to the ROM diagnostic check, which is the initial (i=1) diagnostic process, the processor 105 delivers diagnostic result data 01111111, in which the first bit is "0", over the data bus DBS, and delivers the address signal for the drive circuits 101a-3 through 101h-3 over the address bus ABS. As a result, solely the output of the AND gate AG in the drive circuit 101a-3 goes to logical "0", thereby resetting the flip-flop FF, turning off the transistor Tr and extinguishing the lamp 101a-2. In other words, when normal operation is determined to be the result of diagnosis, the lamp indicating the result of the diagnostic processing is extinguished. If the result of diagnosing the ROM is that the ROM is malfunctioning, then the processor will deliver diagnostic result data 11111111 on the data bus DBS, and the lamp 101a-2 will not be extinguished.

Next, the processor 105 performs the operation i+1→i (=2) and executes the second diagnostic process, namely the battery check for the RAM 103. If the RAM is operating normally, the processor delivers diagnostic result data 00111111, in which the second bit is "0", over the data bus. This is on the assumption that the ROM is operating normally. If the ROM is malfunctioning, then the output delivered will be 10111111. The processor delivers the address signal for the drive circuits over the address bus DBS, thereby extinguishing the lamp 101b-2. If the RAM is malfunctioning, then the processor 105 leaves the second bit at logical "1". As a result, rather than being extinguished, the lamp 101b-2 remains lit.

Thereafter, diagnostic processing is executed in a similar manner and, finally (i=8), the input/output operation is checked. If operation is normal, the processor 105 delivers diagnostic result data 00000000 (assuming all results of diagnosis are normal) on the data bus DBS and, at the same time, delivers the address signal for the drive circuits 101a-3 through 101h-3 over the address bus ABS, thereby extinguishing the lamp 101h-2. More specifically, if the results of all the diagnostic processes are normal, then the lamps 101a-2, 101b-2, .., 101h-2 are extinguished one after another. If, say, solely the ROM fails, the lamp 101a-2 will remain lit, rather than being extinguished, thereby enabling one to recognize that the ROM has failed. All diagnostic processing ends with the output of the eighth diagnostic result.

According to the present invention, diagnostic results can also be displayed on the CRT 104 in the form of a message. If an error indication is given by the lamps and CRT in this manner, then, even if one of these two alternatives fails, it will still be possible to ascertain the failed component in reliable fashion by taking the OR of the two diagnostic result indications.

When it is determined that the result of diagnosis is a normal operation, the function keys equipped with the lamps are used for the originally intended function information inputs, wherein each lamp,is lit by operating the corresponding key and is extinguished when the key is operated again. Described next will be lamp lighting processing effected by key operation. The address signal assigned to the drivers 101a-4 through 101h-4 is periodically delivered over the address bus ABS by the processor 105. When the decoder 101d-1 decodes the address signal, the decoder produces a "1" output to open the drivers 101a-4 through 101h-4. As a result, the on/off states ("on" meaning "1", "off" meaning "0") of the eight switches 101a-1 through 101h-2 are delivered to the data bus in parallel through the drivers 101a-4 through 101h-4, and are read by the processor 105. The processor 105 then delivers, on the address bus ABS, the address signal assigned to the drive circuits 101a-3 through 101h-3 and, on the data bus DBS, the on/off signal for the switches 101a-1 through 101h-2. As a result, the lamps 101a-2 through 101h-2 are lit or extinguished in accordance with the on/off states of the switches 101a-1 through 101h-1.

Thus, according to the present invention, the lamps provided on function keys are used as error lamps when diagnosis is performed. This makes it unnecessary to specially provide error lamps and drive circuits solely for giving error indications and, hence, is advantageous in terms of cost. In addition, an error indication is given by the lamps and an error message displayed on the CRT. Therefore, even if an error lamp or the CRT fails, it will still be possible to ascertain a failed component in a reliable fashion by taking the OR of the two indications. Further, since the arrangement is such that diagnostic processing is performed after the introduction of electric power, it is possible to prevent a situation in which processing is executed despite the existence of a failed component.

Though a case has been described in which the lamps provided on function keys indicate diagnostic results, the present invention is not limited to function keys equipped with lamps, for it is also possible to indicate diagnostic results by lamps provided on other keys. Further, it has been described that the diagnostic program starts to be run upon sensing the introduction of electric power. However, diagnosis can also be initiated by operating a diagnosis request key located on the keyboard.

The present invention makes it possible for a lamp provided on a key to be used as an error lamp when diagnosis is performed, thereby making it unnecessary to provide a special lamp and drive circuit solely for an error indication. The present invention therefore is advantageous in terms of cost and is suitable for use in indicating diagnostic results in various types of equipment.

We claim:

1. A method of indicating the results of diagnosing an apparatus which performs prescribed processing under the control of a control program using input information entered from a keyboard having a plurality of keys, each of which is equipped with a lamp, and which carries out various diagnostic tests in accordance with a diagnostic program, comprising the steps of:
    establishing correspondence between each diagnostic test and each lamp;
    starting the diagnostic program, executing various diagnostic processes on the basis of the diagnostic program; and
    lighting the lamp corresponding to the diagnostic process when a result of the diagnostic process is determined to represent a malfunction.

2. A method of indicating the results of diagnosis according to claim 1, wherein the diagnosistic program is started upon introduction of electric power.

3. A method of indicating the results of diagnosis according to claim 1, further comprising the step of displaying the result of the diagnostic process in the form of a message on a CRT.

4. A method of indicating the results of diagnosing an apparatus which performs prescribed processing under the control of a control program using input information entered from a keyboard having a plurality of keys, each of which is equipped with a lamp, and which carries out various diagnostic tests in accordance with a diagnostic program, comprising the steps of:
    establishing correspondence between each diagnostic test and each lamp;
    starting the diagnostic program;
    lighting all the lamps;
    executing diagnostic processes one at a time; and
    extinguishing the lamp corresponding to the diagnostic process when the result of the diagnostic process indicates normal operation, and leaving the lamp lit when the result of the diagnostic process indicates a malfunction.

5. A method of indicating the results of diagnosis according to claim 4, wherein the diagnostic program is started upon introduction of electric power.

6. A method of indicating the results of diagnosis according to claim 4, further comprising the step of displaying the result of the diagnostic process in the form of a message on a CRT.

* * * * *